Patented Feb. 16, 1943

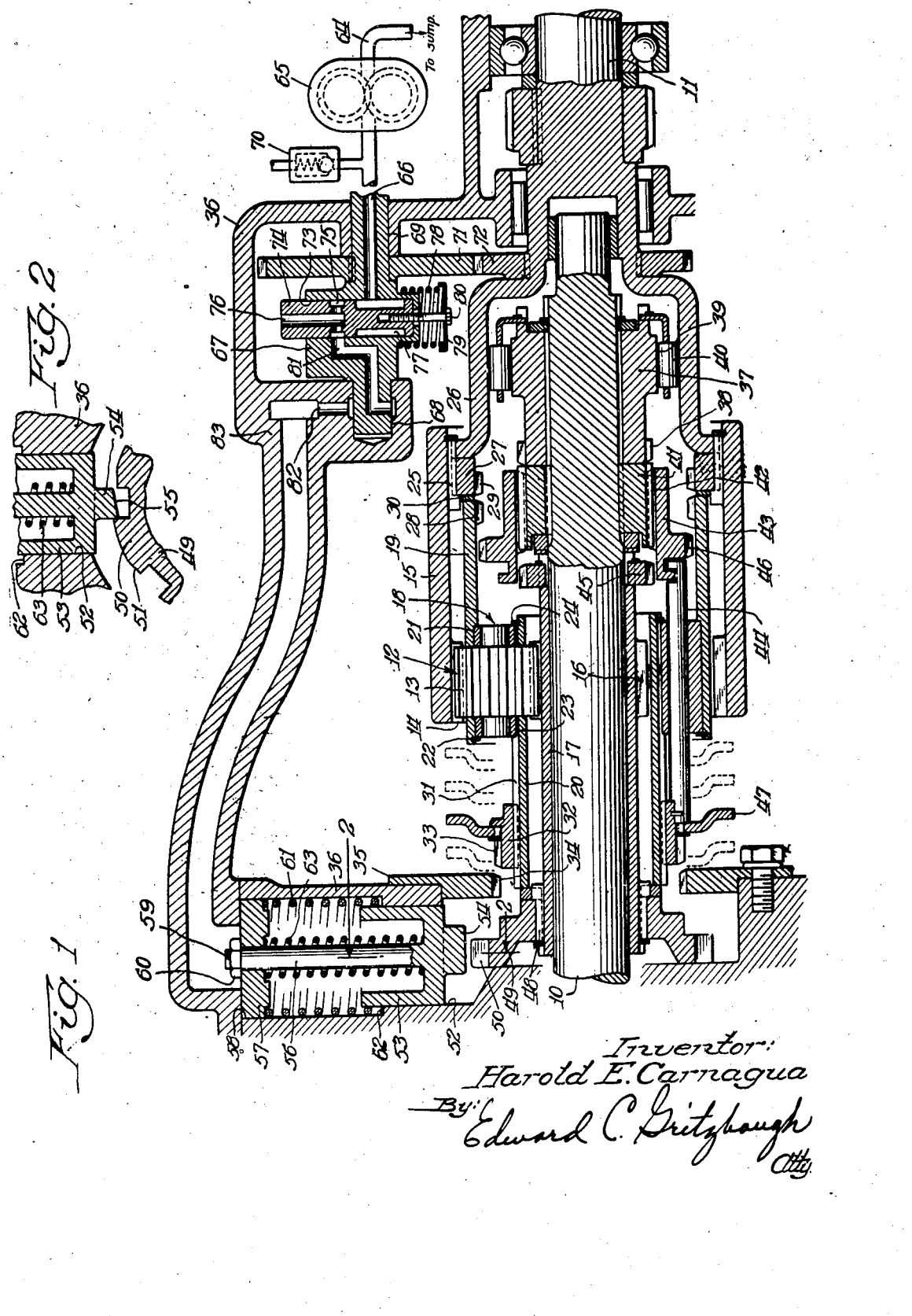

2,311,209

UNITED STATES PATENT OFFICE 2,311,209

PLANETARY TRANSMISSION

REISSUED
FEB 12 1946

Harold E. Carnagua, Muncie, Ind., assignor to Borg-Warner Corporation, Chicago, Ill., a corporation of Illinois Application August 25, 1941, Serial No. 408,171

8 Claims. (Cl. 74—260)

This invention relates to power transmitting devices of the planetary gear type and particularly to such a transmission which is adapted to provide a plurality of forward driving speed ratios including an overdrive ratio.

The present day internal combustion engines of the type and proportion generally used in an automobile require the use of a variable speed transmission between the engine and wheels in order to satisfy generally accepted performance requirements. Such a transmission, however, if satisfactory as to speed ratios is apt to be bulky and difficult to manipulate. To reduce the size of such a transmission it has been proposed to take advantage of certain inherent characteristics of the planetary type of gearing whereby but one planetary gear set will be sufficient to provide a reverse ratio, a neutral, a direct drive and an overdrive. The simplicity of gearing thereby obtained is somewhat detracted from, however, by the resulting complexity of the controls necessary to bring about the ratio changes.

The principal object of this invention is to provide a multiple ratio single planetary transmission wherein the controls are improved and simplified so as to render the transmission less expensive to build and maintain.

Another object of this invention is to provide a transmission wherein a manually operated direct drive is secured and an automatic shift is made between direct and an overdrive ratio, the shift employing hydraulically controlled means.

These and other objects and features of the invention will become apparent from the following description when taken together with the accompanying drawing in which:

Fig. 1 is a side elevation in section of the improved transmission; and

Fig. 2 is a fragmentary elevation taken along lines 2—2 of Fig. 1, showing in detail the form of one of the coupling means.

Referring now to the drawing for a detailed description of the invention, 10 is a drive shaft which is adapted to be connected to a prime mover such as the internal combustion engine of an automobile or to the output of an auxiliary transmission. The driven shaft is shown at 11 and is adapted to be connected to a load such as the rear wheels of an automobile (not shown). Between drive shaft 10 and driven shaft 11 is a planetary gear set 12 which is adapted to be connected to the shafts by means hereinafter to be described to produce a reverse drive, a neutral, a direct drive and an overdrive. Said planetary gear set is comprised of one or more planet gears 13 meshing with a ring gear 14 formed on the interior of a drum 15, and with a sun gear 16 formed on the exterior of a sleeve 17. Said planet gears are mounted on a carrier 18 with which is rotatable a large drum 19 and a smaller drum 20, drum 19 extending to the right of carrier 18 as viewed in Fig. 1 and drum 20 extending to the left. Drum 19 is fixed axially with respect to carrier 18 by means of a shoulder 21 on one side and a ring 22 on the other side. Similarly drum 20 is fixed axially with respect to carrier 18 by means of a shoulder 23 on one side and a snap ring 24 on the other side of carrier 18. Both drums 19 and 20 are attached to and rotate with carrier 18.

The right hand end (Fig. 1) of ring gear drum 15 is provided with splines 25 with which are drivingly connected a belled portion 26 of driven shaft 11 and an internally toothed clutch element 27. It is apparent that ring gear 14 and clutch element 27 are constrained to rotate with driven shaft 11 at all times.

The right hand end (Fig. 1) of drum 19 is provided with clutch teeth 28 which are of the same size as internal clutch teeth 29 on clutch element 27. A washer 30 spaces the two clutch teeth and prevents excessive axial movement between ring gear 14 and planetary gears 13.

Smaller drum 20 is provided with external splines 31 which mesh with a slidable sleeve 32 which is likewise provided with external teeth or splines 33. Said sleeve 32 is adapted to slide axially along splines 31 to assume a plurality of positions. In the extreme left hand position, teeth 33 engage with teeth 34 on a plate 35 which is bolted or otherwise non-rotatably secured to the casing 36 of the transmission. When so engaged, sleeve 32, its associated drum member 20 and carrier 18 are all held against rotation, thereby making possible a reverse drive through planetary gear set 12.

Loosely mounted on drive shaft 10 and within belled portion 26 of driven shaft 11 is a hub member 37 having external teeth 38 formed on one end thereof and a series of cams 39 formed on the other end. Between cams 39 and the inner surface of belled portion 26 are located rollers 40 which constitute a one-way or free-wheeling drive between hub member 37 and driven shaft 11.

Immediately adjacent hub member 37 is a collar 41 which is splined to drive shaft 10 so as to be rotatable therewith. Said collar 41 has external splines or teeth 42 on which is mounted an internally splined sleeve 43, said sleeve 43 being axially slidable relative to collar 41. Said sleeve 43 is connected to sleeve 32 by means of a plurality of pins 44 passing through carrier 18 and slidable axially relative thereto. Thus sleeve 32 and sleeve 43 are constrained to move together. The connection between pins 44 and sleeve 43 is such as to permit relative rotation therebetween so that if sleeve 32 is in its extreme left hand position wherein it is held against rotation, sleeve 43 may be rotated by the drive shaft.

Sun gear sleeve 17 is provided at one end with a toothed clutch element 45 which is adapted to be engaged by the internal teeth of sleeve 43 when the latter is moved to its extreme left hand position. It will be apparent now that in this position sun gear 16 will be driven by the drive shaft through sleeve 43, and carrier 18 will be held against rotation, thereby causing ring gear 14 to be driven reversely and with it the driven shaft 11. Sleeve 43 is also provided with external teeth 46 which are adapted to engage teeth 28 and 29 on drum 19 and clutch element 27, respectively. When engaged with either of these teeth, the internal splines likewise engage teeth 38 on hub member 37 and thereby transmit drive simultaneously to this member.

When teeth 46 engage teeth 28, drum 19 and hub member 37 are both driven by the drive shaft and, depending upon whether or not sun gear 16 is held against rotation, the transmission will be either in direct drive or in overdrive, direct drive being secured through the free-wheel connection established between cams 39, roller 40 and belled portion 26 of driven shaft 11.

When sleeve 43 is in its extreme right hand position so that teeth 46 engage teeth 29 and do not engage teeth 28, said sleeve 43 provides a direct connection between belled portion 26 and drive shaft 10 so as to lock out the free wheeling action of rollers 40. In this position direct drive only will be obtainable.

The position of sleeve 32 and sleeve 43 is determined by means of a manually controlled disc 47 which is secured to sleeve 32.

The transmission illustrated is designed to produce an overdrive automatically through the planetary gear set. The latter is conditioned for overdrive operation by arresting sun gear 16 and coupling teeth 46 on sleeve 43 with teeth 28 on drum 19. The means by which sun gear 16 is held against rotation will now be described.

It will be observed that on the left hand end (Fig. 1) of sleeve 17 are formed external teeth or splines 48. An internally toothed disc 49 meshes with splines 48 to cause said disc to rotate with sleeve 17 and sun gear 16. Around the outer periphery of disc 49 are teeth 50 as shown in Fig. 2, the teeth having sloping or cammed outer surfaces 51. Located within housing 36 is a bore 52 within which is reciprocable a piston 53. The outer end of piston 53 is formed into a tooth 54 resembling a pawl the outer surface 55 of which is also sloped or cammed. The inside of piston 53 is formed into a rod 56 which passes through a second piston 57 located in a larger bore 58. The end 59 of rod 56 is threaded to receive a nut 60 which forms an abutment for piston 57. A coil spring 61 reacts against the shoulder 62 formed by the junction of bores 52 and 58 and urges piston 57 outward in a direction to withdraw rod 56 and its associated piston 53 and pawl 54 from contact with teeth 50 on disc 49. A second coil spring 63 is designed specifically to take up the lost motion connection between pistons 53 and 57 by tending to separate the pistons.

Thus when fluid under pressure is admitted behind piston 57 the pressure will be transmitted through spring 63 to piston 53 which in turn will be urged toward disc 49 to engage pawl 54 with teeth 50. If at the moment there is relative rotation between teeth 50 and pawl 54, engagement will be precluded by the camming action of the surfaces 51 and 55 against one another. The pressure of the fluid will be absorbed in spring 63 so that piston 57 may assume its fully engaged position and remain in such position independently of the movement of piston 53. At the instant when relative rotation between the disc and pawl ceases and slightly reverses its direction, pawl 54 will engage teeth 50 and thus arrest the rotation of sun gear 16.

The automatic control for the fluid pressure will now be described. The fluid circuit includes a conduit 64 leading to a sump or other reservoir of fluid such as oil, which conducts the fluid to a suitable power driven pump 65 and thence to a conduit 66 formed in a rotatable valve block 67 which is trunnioned in casing 36 at 68 and 69. The pressure within conduit 66 is regulated by means of a suitable pressure relief valve 70. Valve block 67 is connected by means of gears 71 and 72 to driven shaft 11 so as to be rotatable in response to the rotation of said driven shaft. Within valve block 67 is a radial bore 73 in which is mounted a valve 74. Said valve has a circumferential groove 75 in communication with a central vent groove 76, and a relatively wide circumferential groove 77 located adjacent groove 75. A spring 78 acting against a washer 79 and a bolt 80 threaded to valve 74 biases said valve radially inward. It will be noted that the bulk of the valve is eccentric to the axis of rotation and that this eccentricity will tend to increase as the valve is rotated. The spring thus counteracts the centrifugal force developed in the rotating valve and it may be adjusted to provide any suitable initial tension. A conduit 81 in valve block 67 is so located with respect to conduit 66 and circumferential groove 75 and 77 that when the valve is in the position shown, that is, the position assumed when it is not rotating, conduit 81 will be vented through groove 75 and conduit 76, and at the same time conduit 66 will be blocked off. When the valve is rotated at some predetermined speed, say for example a vehicle speed of 23 miles per hour, it will assume a position such that circumferential groove 77 will connect conduit 66 with conduit 81 and admit fluid pressure past the valve.

Conduit 81 connects with conduits 82 and 83 in casing 36 which ultimately connects with bore 58.

It will be evident from the foregoing description that when control disc 47 is in its first left hand position (Fig. 1) the planetary gear set and clutches will be set for reverse operation. When control disc 47 is in the position shown in full lines the transmission is in neutral and no power can be transmitted between the shafts. In the next position the planetary gear set will be in condition for free-wheeling direct and overdrive, and in the farthermost right hand position, the transmission will be set for locked-up direct drive. When control disc 47 is set for direct drive and overdrive operations, valve block 67 is rotated and with it is rotated valve 74. Up to the predetermined speed for which the valve is set, conduit 81 will be vented through the valve and there will be no pressure behind the piston 58. At or above the predetermined speed, valve 14 will be in its radially outward position wherein fluid under pressure is admitted behind piston 58 to force it inward together with pawl 54. The sun gear will not be immediately arrested, however, since the camming action of the pawl and teeth 50 will prevent such engagement. To engage the pawl with the teeth, torque on drive shaft 10 is momentarily released as by slowing down the prime mover in order to slow down this shaft with respect to the driven shaft, the latter rotating at substantially the same speed due to the momentum of the load associated therewith. The slowing down of drive shaft 10 causes disc 49 to slow down and eventually to come to a standstill and then begin to rotate in the reverse direction. When this occurs the disc will be rotated just far enough to permit pawl 54 to become aligned with a slot or space between teeth and it will then engage the teeth and hold the sun gear against rotation. During this time the driven shaft has been free-wheeling with respect to the drive shaft. When the sun gear is arrested, the drive then becomes an overdrive and will obtain as long as fluid pressure is present behind piston 51.

It is to be understood that the foregoing description is merely illustrative of the preferred embodiment of the invention and that the scope of the invention therefore is not to be limited thereto but is to be determined by the appended claims.

I claim:

1. A transmission comprising drive and driven shafts, planetary gearing connectible between the shafts to establish reverse, direct and overdrive ratios, a source of fluid under pressure, a centrifugally operable valve driven from the driven shaft, a positive brake for arresting the rotation of the sun gear to establish overdrive, hydraulic means for operating the brake, said hydraulic means comprising a fixed housing having a bore therein, a step in the bore, a piston in the wider portion of the bore, a second piston in the narrower portion of the bore, a lost motion connection between the pistons, resilient means between the steps and one of the pistons for urging the said one of the pistons in a direction to take up the lost motion connection, and resilient means for transmitting the pressure from one piston to the other; and conduits connecting the source of fluid under pressure, the valve and the hydraulic means, said valve being adjusted to admit fluid under pressure to the hydraulic means at a predetermined speed of the driven shaft to establish overdrive.

2. A transmission comprising drive and driven shafts, planetary gearing connectible between the shafts to establish reverse, direct and overdrive ratios, a source of fluid under pressure, a centrifugally operable valve driven from the driven shafts, a positive brake for arresting the rotation of the sun gear to establish overdrive, hydraulic means for operating the brake, said hydraulic means comprising a fixed housing having a bore therein, a step in the bore, a piston in the wider portion of the bore, a second piston in the narrower portion of the bore, a lost motion connection between the pistons, resilient means between the steps and one of the pistons for urging the said one of the pistons in a direction to take up the lost motion connection, and resilient means for transmitting the pressure from one piston to the other; the brake comprising a wheel on the sun gear, said wheel having slots, and a pawl on one of the pistons engageable with the slotted wheel to arrest the rotation of the sun gear, and conduits connecting the source of fluid under pressure, the valve and the hydraulic means, said valve being adjusted to admit fluid under pressure to the hydraulic means at a predetermined speed of the driven shaft to establish overdrive.

3. A transmission comprising drive and driven shafts, planetary gearing connectible between the shafts to establish reverse, direct and overdrive ratios, a source of fluid under pressure, a positive brake for arresting the rotation of the sun gear to establish overdrive, hydraulic means for operating the brake, a centrifugally operable valve driven from the driven shaft, the valve comprising a rotatable block, a radially disposed valve in the block, and resilient means for urging the valve radially inward, said valve having a circumferential groove in communication with a vent opening, and a second circumferential groove, said second groove being connected only with the conduit to the hydraulic means when the valve is rotated below a predetermined speed, and the second groove connecting the source of fluid under pressure and the hydraulic means conduits when the valve is rotated above a predetermined speed; and conduits connecting the source of fluid under pressure, the valves and the hydraulic means, said valves being adjusted to admit fluid under pressure to the hydraulic means at a predetermined speed of the driven shaft to establish overdrive.

4. A transmission comprising drive and driven shafts, planetary gearing connectible between the shafts, and control means for the planetary gearing adapted to establish a plurality of speed ratios through said planetary gearing, said control means comprising an element loosely mounted on the drive shaft, a slidable sleeve mounted for rotation with the drive shaft, an overrunning clutch between the element and driven shaft, and cooperable clutch means on the sleeve and driven shaft, said sleeve in a first position being disconnected from the element and driven shaft, in a second position connecting the element with the drive shaft to establish a free wheel drive, and in a third position connecting the shafts together for a two-way drive.

5. A transmission comprising drive and driven shafts, planetary gearing connectible between the shafts to establish a plurality of speed ratios, said planetary gearing including a planet gear carrier, a splined drum rotatable with the carrier, a positive brake for the carrier comprising a fixed element and an axially slidable element adapted to engage the fixed element, said axially slidable element being mounted to rotate with the drum, an element loosely mounted on the drive shaft, a slidable sleeve mounted for rotation with the drive shaft, an overrunning clutch between the loosely mounted element and driven shaft, and cooperable clutch means on the sleeve, loosely mounted element and driven shaft, said sleeve in a first position being disconnected from the loosely mounted element and driven shaft to establish neutral, in a second position connecting the loosely mounted element with the driven shaft to establish a free-wheel direct drive, and in a third position connecting the shafts together for a positive two-way drive, and means connecting the slidable sleeve on the drive shaft with the slidable brake element on the carrier drum to cause the two to move in unison, said connecting means preventing the engagement of the brake elements when the slidable sleeve is in neutral, free-wheel direct, or positive direct positions.

6. A transmission as described in claim 5, said carrier having a second drum rotatable therewith and extending in the direction of the driven shaft, said drum having clutch means cooperable with the clutch means on the slidable sleeve rotatable with the drive shaft and effective to couple the drive shaft with the carrier to condition the transmission for overdrive.

7. A transmission comprising drive and driven shafts, planetary gearing connectible between the shafts to establish a plurality of speed ratios, said gearing comprising a ring gear, a sun gear and a planet gear carrier, a sleeve surrounding the drive shaft and rotatable with the sun gear, a brake element on one end of the sun gear sleeve, a clutch element on the other end of the sleeve, a drum on the carrier, means spacing the drum from the brake element, means preventing axial movement between the carrier and drum, a second drum on the carrier and extending in the opposite direction from that of the first drum, means on the second drum preventing relative movement between the drum and carrier in the direction of the brake element, a clutch element on the driven shaft in proximity to the clutch element on the second drum, spacing means between the two elements, said spacing means limiting the movement of the second drum and associated carrier and first drum in the direction of the driven shaft, a collar splined to the drive shaft, a slidable sleeve on the collar rotatable with the collar and having a clutch element cooperable with the clutch element on the second drum and with the element on the driven shaft, means for connecting the slidable sleeve with the clutch element on the sun gear sleeve so as to drive the latter from the drive shaft, a second brake element, and a slidable sleeve on the first carrier drum engageable with the second brake element to arrest the rotation of the carrier, and means connecting the slidable sleeve and the drive shaft collar with the brake elements on the first carrier drum so as to cause the two to move in unison, said connecting means in one position connecting the sun gear to the drive shaft and the carrier to the brake element, in a second position disconnecting the drive shaft from the sun gear and the brake element from the carrier to provide a neutral, in a third position connecting the clutch on the second drum to the drive shaft to provide a free-wheeling direct drive, and in a fourth position connecting the drive and driven shaft directly together.

8. A transmission comprising drive and driven shafts, planetary gearing connectible between the shafts and comprising a ring gear, a sun gear and planet pinions meshing with the ring and sun gears, a carrier for the planet gears, a brake means cooperable with the carrier to arrest the rotation thereof, a freely rotatable collar on the drive shaft, an overrunning clutch between the collar and driven shaft, axially fixed clutch means on the collar, the sun gear, the carrier and on the drive shaft, axially slidable clutch means adapted in one position to connect the drive shaft to the sun gear, in another position to the carrier and collar, and in a third position to the driven shaft and collar, a slotted brake member on the sun gear, a radially movable pawl adapted to engage the slotted brake member to arrest the rotation of the sun gear, piston means for effecting radial movement of the pawl to engaged and disengaged positions, a hydraulic circuit including a source of fluid under pressure and conduits for conducting the fluid under pressure to the piston, a centrifugally operable valve in the hydraulic circuit adapted in one position to vent the fluid behind the piston and in another position to admit fluid under pressure therebehind, a gear drive between the driven shaft and valve for driving the valve in response to rotation of the driven shaft, and a brake for the carrier, said brake being movable in unison with the axially slidable clutch element on the drive shaft such that when the sun gear is driven by the drive shaft the carrier is held against rotation to establish reverse drive, said valve being adjusted to bias the pawl to engaged position to establish overdrive when a predetermined speed of rotation is reached.

HAROLD E. CARNAGUA.